United States Patent
Chao et al.

(10) Patent No.: US 7,660,291 B2
(45) Date of Patent: Feb. 9, 2010

(54) METHOD FOR PROCESSING PACKETS OF A VLAN IN A NETWORK SWITCH

(75) Inventors: Yun-Fei Chao, Taipei (TW);
Ying-Chung Chen, Taipei (TW);
Ming-Chao Chung, Taipei (TW);
Wei-Pin Chen, Taipei (TW)

(73) Assignee: Via Technologies Inc., Hsin-Tien, Taipei (TW)

( * ) Notice: Subject to any disclaimer, the term of this patent is extended or adjusted under 35 U.S.C. 154(b) by 771 days.

(21) Appl. No.: 11/291,393

(22) Filed: Dec. 1, 2005

(65) Prior Publication Data
US 2007/0127376 A1 Jun. 7, 2007

(51) Int. Cl.
*H04L 12/28* (2006.01)
(52) U.S. Cl. ........................... 370/351; 370/230
(58) Field of Classification Search ........... 370/230, 370/231, 235, 351–357, 359, 360, 369–372, 370/375, 386–389, 392, 395.1, 396–399, 370/395.3, 395.32, 395.7, 427
See application file for complete search history.

(56) References Cited

U.S. PATENT DOCUMENTS 6,115,379 A * 9/2000 Flanders et al. ............. 370/392
7,460,542 B2 * 12/2008 Bhatia ................... 370/395.31

* cited by examiner

*Primary Examiner*—Salman Ahmed
*Assistant Examiner*—Blanche Wong
(74) *Attorney, Agent, or Firm*—Thomas, Kayden, Horstemeyer & Risley

(57) ABSTRACT

A method for processing packets of a VLAN in a network switch is provided. The VLAN comprises a plurality of physical LANs and are divided into a plurality of subnets. The method comprises the steps of: receiving a packet through an ingress port of the network switch, wherein the packet is tagged with a VID of the VLAN; finding a VLAN member according to the VID, wherein the VLAN member represents all ports of the network switch dedicated to serving packets of the VLAN; finding a forwarding scope according to the ingress port, wherein the ingress port is one of the ports dedicated to serving packets of a first subnet of the VLAN and the forwarding scope represents all ports of the network switch dedicated to serving packets of the first subnet; and determining an egress port of the packet according to both the VLAN member and the forwarding scope.

18 Claims, 6 Drawing Sheets

METHOD FOR PROCESSING PACKETS OF A VLAN IN A NETWORK SWITCH

BACKGROUND

The present invention relates to network communication, and more particularly, to a network switch.

A virtual local area network, commonly known as a VLAN, is a logically independent network. Several VLANs can co-exist on a single physical switch. IEEE 802.1Q is the predominant protocol.

Early VLANs were often configured to reduce the size of the collision domain in a large single Ethernet segment to improve performance. When Ethernet switches made this a non-issue, attention turned to reducing the size of the broadcast domain at the media access control (MAC) layer. Another purpose of a virtual network is to restrict access to network resources without regard to physical topology of the network, although the strength of this method is debatable.

FIG.1 shows the frame format 100 according to the IEEE 802.1Q standard. Field 102 and 104 are destination and source MAC addresses of the frame, respectively. IEEE 802.1q does not actually encapsulate the original frame. Instead, it adds an extra 4-byte VLAN tag header 106 to the original Ethernet header. The EtherType 108 is changed to 0x8100, denoting the new frame format. The VLAN tag header 106 contains the following fields: user_priority, CFI, and VID. User_priority field 110 is 3-bits long and can be used to store a priority level for the frame. CFI field 112 is a 1-bit flag denoting whether MAC addresses in the frame are in canonical format. This is called the Canonical Format Indicator. VID field 114 is a 12-bit VLAN ID and allows up to 4096 VLANs.

The VID field 114 of VLAN tag 106 in IEEE 802.11Q is of great use for switches of the Internet service providers (ISP). In the ISP network, a switch often uses the VID of a received packet as a reference for deciding the egress port forwarded the packet. In general, a switch supports single VID space, wherein the VID space indicates the 4096 number of VLAN which can be specified by the 12-bit VID field. If more than one LAN segment or physical LAN with the same VID is simultaneously connected to the ISP network via a switch, however, the switch cannot differentiate between the LAN segments or physical LANs, and the packets moving toward those LAN segments or physical LANs will be guided to the wrong egress port in the switch.

SUMMARY

The invention provides a method for processing packets of a VLAN in a network switch. The VLAN comprises a plurality of physical local area networks and are divided into a plurality of subnets, and each of the subnets includes some of the physical LANs. An exemplary embodiment of the method comprises the steps of: receiving a packet through an ingress port of the network switch, wherein the packet is tagged with a VLAN identifier (VID) of the VLAN; reading the VID of the packet; finding a VLAN member according to the VID of the packet, wherein the VLAN member represents all ports of the network switch dedicated to serving packets of the VLAN; finding a forwarding scope according to the ingress port, wherein the ingress port is one of the ports dedicated to serving packets exchanged within a first subnet of the VLAN, and the forwarding scope represents all ports of the network switch dedicated to serving packets exchanged within the first subnet which is the one of the plurality of the subnets; and determining an egress port of the received packet according to both the VLAN member and the forwarding scope.

A network switch for processing packets of a virtual local area network (VLAN) is provided. The VLAN comprises a plurality of physical local area networks and are divided into a plurality of subnets, and each of the subnets includes some of the physical LANs. An embodiment of the network switch comprises: a plurality of ports, for receiving and transmitting a packet exchanged within the VLAN; and a core module, coupled to the plurality of ports, for finding a VLAN member according to a VID of the packet, finding a forwarding scope according to an ingress port of the packet, deciding an egress port of the packet from the plurality of ports according to both the VLAN member and the forwarding scope, and forwarding the packet to the egress port for guiding the packet to its destination.

In the above embodiment, the VID is identifier of the VLAN, the VLAN member represents all of the plurality of ports dedicated to serving packets of the VLAN, the ingress port is one of the plurality of ports dedicated to serving packets exchanged within a first subnet of the VLAN, and the forwarding scope represents all of the plurality of ports dedicated to serving packets exchanged within the first subnet which is the one of the plurality of the subnets.

DESCRIPTION OF THE DRAWINGS

The invention can be more fully understood by reading the subsequent detailed description in conjunction with the examples and references made to the accompanying drawings, wherein.

DETAILED DESCRIPTION

Figure 1:
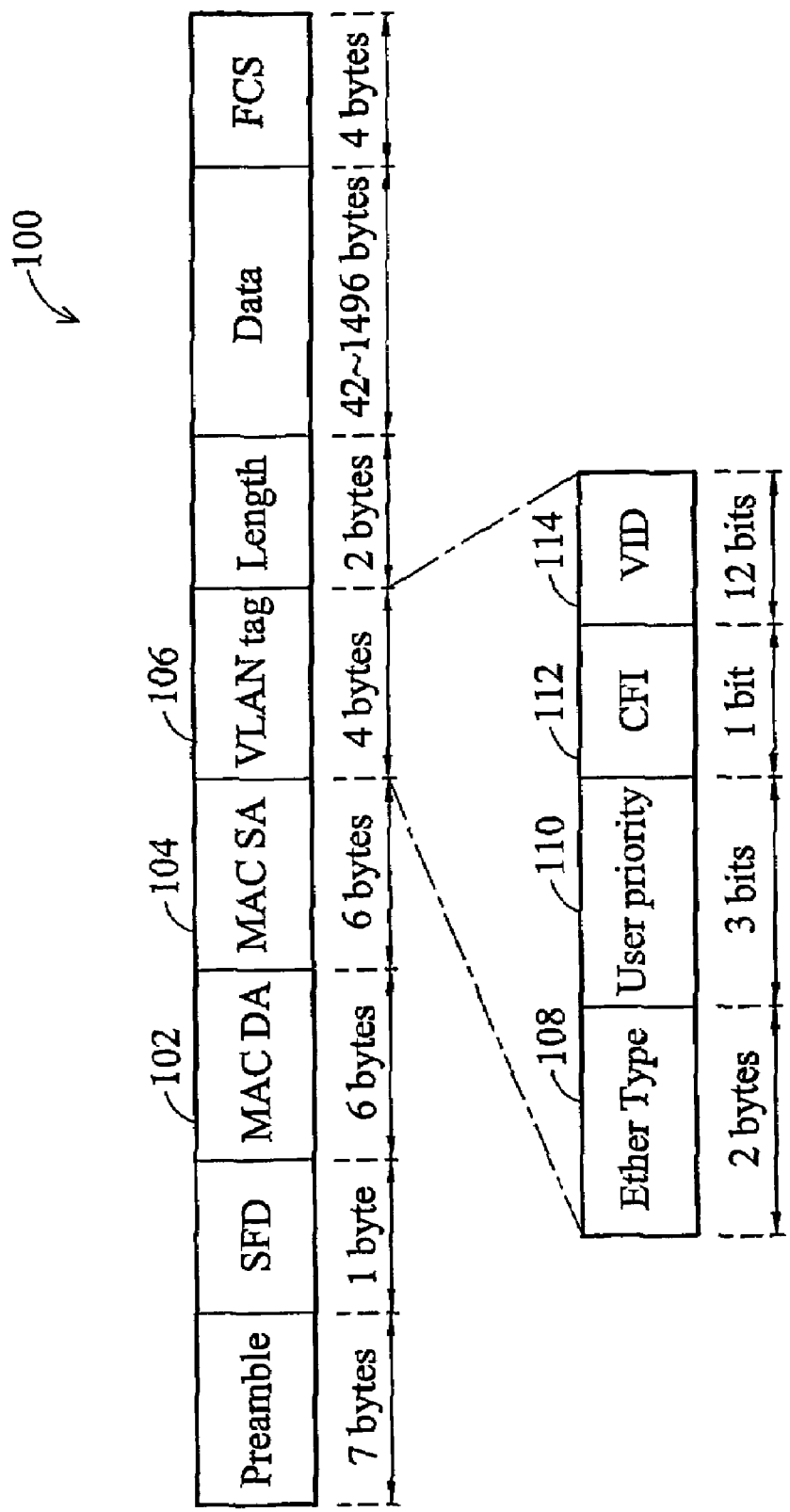
FIG. 1 shows the frame format 100 according to the IEEE 802.1Q standard.
Figure 2:
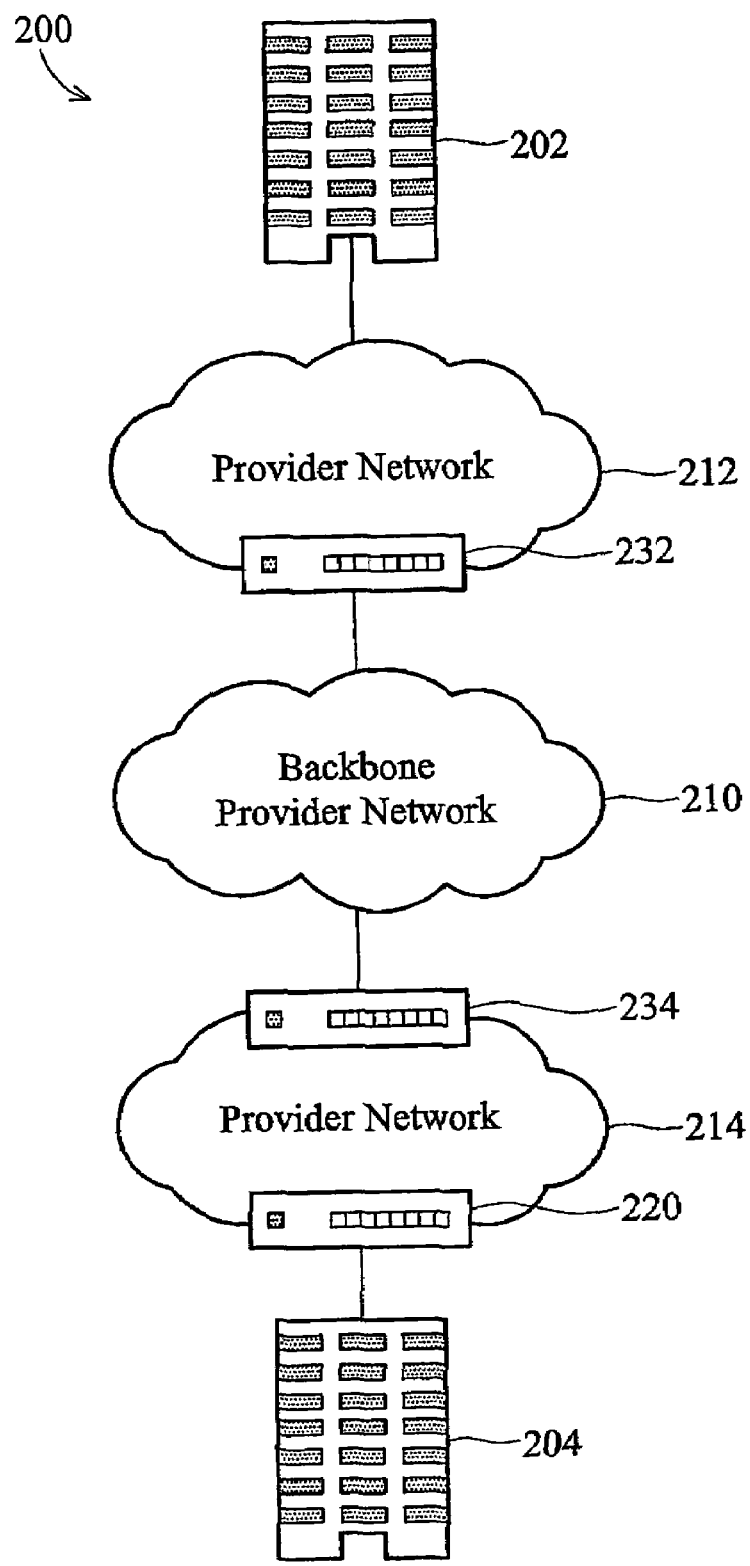
FIG. 2 shows an example of a network system for realizing connections between two LANs which belongs to the same VLAN but are separated by a long distance.

FIG. 2 shows an example of a network system 200 for realizing connections between two LANs 202 and 204 which belong to the same VLAN but are separated by a long distance. LAN 202 is a local area network or a segment of a local area network. LAN 204 is also a local area network or a segment of a local area network. Both LAN 202 and 204 belong to the same VLAN, hence, packets from LAN 202 and 204 have the same VLAN ID or VID. Because LAN 202 is physically separated by a long distance from LAN 204, LAN 202 and 204 must first be connected to local provider networks 212 and 214 respectively, that they can thus be further connected via a backbone provider network 210 to realize packets exchange there between.

For example, LAN 202 can be a LAN of a research department of a company in city A. LAN 204 can be a LAN of another research department of the same company in city B. Local provider network 212 is the network of Internet service provider in city A and connects LAN 202 to an Internet backbone through the backbone provider network 210. Local provider network 214 is the network of Internet service provider in city B and connects LAN 204 to the Internet backbone through the backbone provider network 210. Thus the physical LAN 202 of the research department in city A can be connected with the physical LAN 204 of the research department in city B to realize the logical VLAN of the company.

Assume the VID of the logical VLAN of the company is 4000. If LAN 202 wants to send a packet to LAN 204, the packet is first attached a VLAN tag which assigns a VID of 4000 to the packet. The attachment of a VLAN tag can be implemented by LAN 204 itself before the packet is delivered to provider network 212. However, because there is a large number of different VLANs connected to the backbone provider network 210, a 12-bit VID cannot accommodate so many VLANS. Therefore, when the packet is delivered by provider network 212 to backbone provider network 210, an extended VID containing more bits for representing more VLANs in the backbone provider network 210 is further attached to the packet by a boundary switch 232. For example, an extended VID of 20000 is attached to the packet by the backbone provider network 210 in place of the original VID of 4000.

When the packet is delivered by backbone provider network 210 to provider network 214, the extended VID of 20000 is removed from the packet by a boundary switch 234 to restore the original VID of 4000. The packet is then delivered from provider network 214 to LAN 204 with a network switch 220. The packet is then delivered by LAN 204 to the destination host according to the destination MAC address of the packet.

Figure 3:
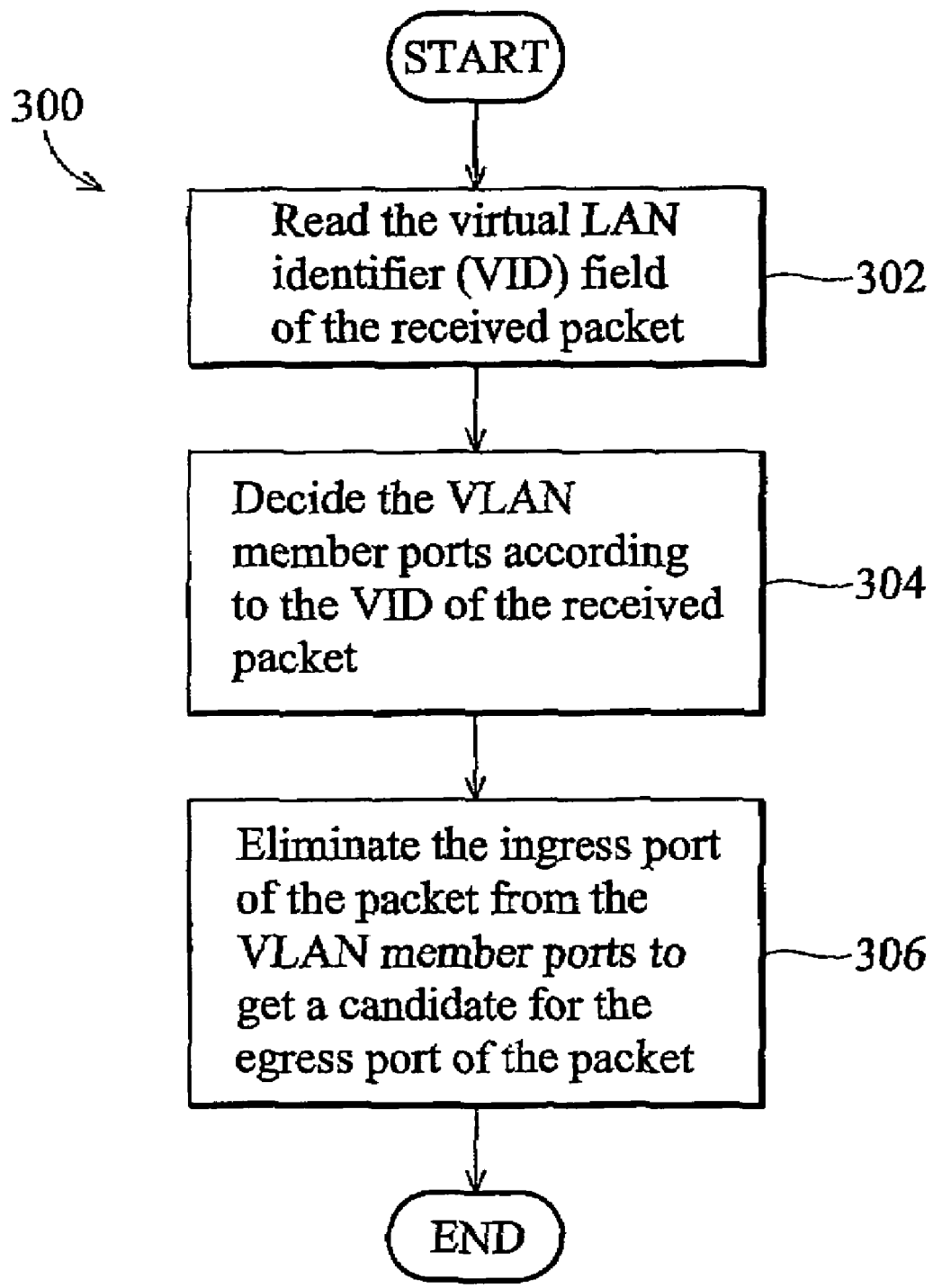
FIG. 3 shows an example of a method for deciding the egress port of packets exchanged between two LANs of the same VID by a network switch which supports a single VID space.

FIG. 3 is an example of a method 300 for deciding the egress port of packets exchanged between two LANs 202 and 204 of the same VID by network switch 220 which supports a single VID space. Because the traffic through network switch 220 is heavy, network switch 220 decides the egress port to which the received packet is forwarded according to the VID of the packet. The VID is not necessarily in the form of 802.1Q standard, but can also be in the form of port-based VID or other VLAN ID format. Thus, method 300 starts with step 302 to read the VID field of the received packet. Assume the VID of the received packet is 4000. Network switch 220 must then decide which port the received packet should be forwarded to for guiding the packet to its destination.

Assume that there are 26 ports in network switch 220, and the ports used to serve packets of VID 4000 are ports 0 and 22. Here the ports serving packets of a specific VLAN are called "VLAN member" of the specific VLAN. The VLAN member in relation to the received packet is then looked up according to the VID of the received packet in step 304. Thus, the VLAN member of VID 4000 includes ports 0 and 22. Finally, the egress port of the packet can be decided according to the VLAN member and its ingress port in step 306. If the ingress port of the packet is port 22 of network switch 220, the egress port must be the port belonging to the VLAN member but other than the ingress port 22. Thus the egress port of the packet is decided to be port 0, and the packet is forwarded to port 0.

Figure 4:
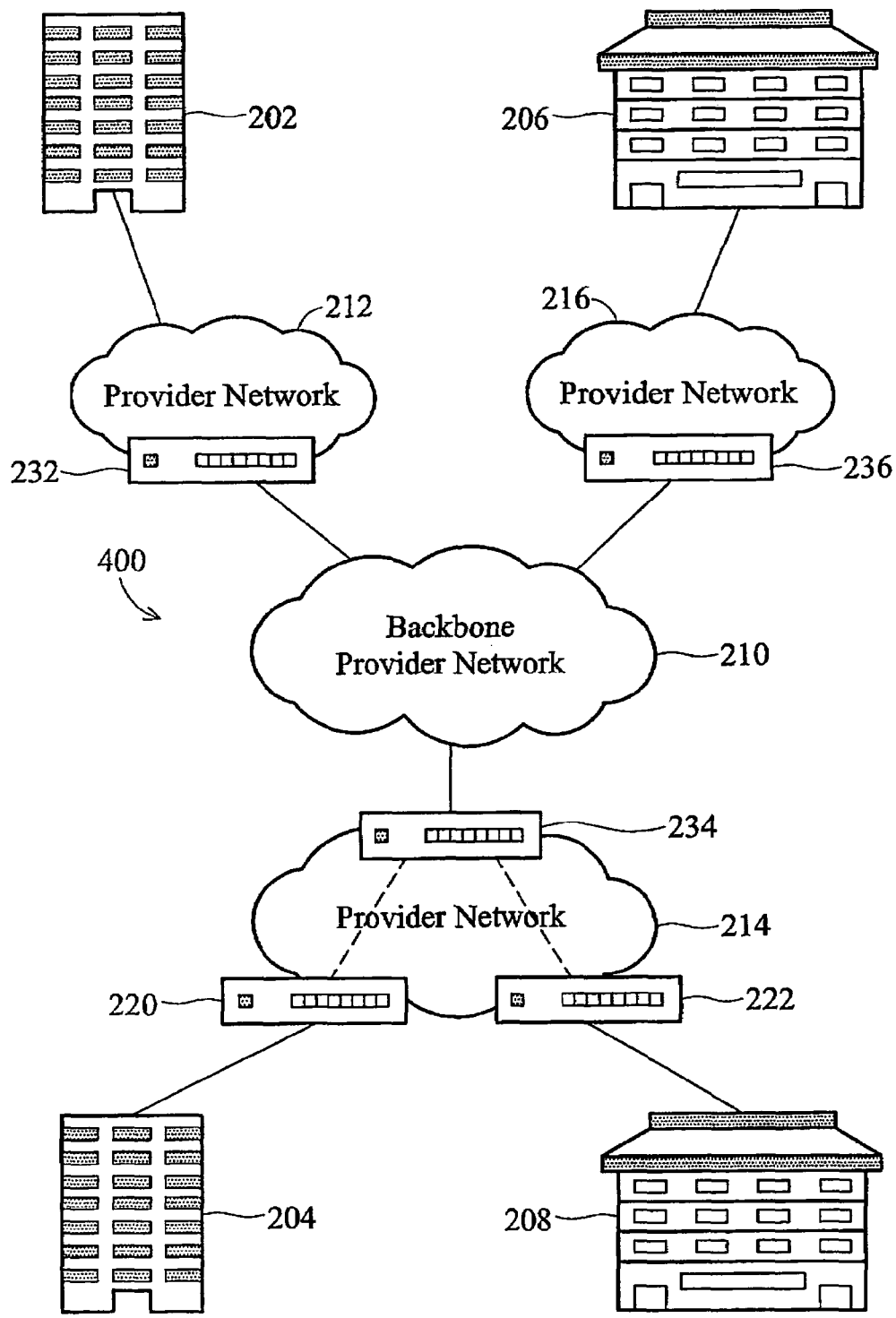
FIG. 4 shows an example of a network system for realizing connections between four LANs belonging to the same VLAN.

FIG. 4 shows an example of a network system 400 for realizing connections between four LANs 202, 204, 206, and 208 belonging to the same VLAN. Network system 400 substantially resembles network system 200, but there are two further LANS 206 and 208 with the same VID 4000. LAN 202 may be a LAN of a research department of a company in city A, and LAN 204 may be a LAN of another research department of the company in city B. The research department in city A tries to communicate with the research department in city B. LAN 206 may be a LAN of a business department of the company in city C, and LAN 208 may be a LAN of another business department of the company in city B. The business department in city C tries to communicate with the business department in city B.

Provider network 212 is the network of Internet service provider in city A and connects LAN 202 to an Internet backbone of the backbone provider network 210. Provider network 214 is the network of Internet service provider in city B and connects LANs 204 and 208 to the Internet backbone of the backbone provider network 210. Provider network 216 is the network of Internet service provider in city C and connects LAN 206 to the Internet backbone of the backbone provider network 210.

Assume the packets from LAN 202, 204, 206, and 206 are all attached with a VLAN tag which includes a VID field of 4000. Assume the research department in city A wants to send a first packet to the research department in city B and the business department in city C wants to send a second packet to the business department in city B. Although the VIDs of the first packet and the second packet are both 4000, the backbone provider network 210 can still distinguish between the first packet and the second packet, because an extended VID of 20000 in the backbone provider network 210 will be further attached to the first packet by the boundary switch 232, and an extended VID of 10000 in the backbone provider network 210 will be further attached to the second packet by a boundary switch 236.

However, when the first packet and the second packet are delivered from the backbone provider network to the provider network 214, their extended VID of 20000 and 10000 are removed by the boundary switch 234, and both packets have the same VID of 4000. If provider network 214 connects to both LAN 204 and LAN 208 with a single network switch 220 as in network system 200, because the network switch 220 decides the egress port of a received packet according to the VID of the received packet and both of the ports connected to LAN 204 and 208 are VLAN member of VID 4000, the network switch 220 cannot decide to which the egress ports the first and second packets should be forwarded, and the first and second packets may even be forwarded to a wrong egress port.

The above-mentioned problem arises from the fact that the network switch 220 supports only a single VID space, which is the number of VLANs which can be specified by the 12-bit VID field. If there is more than one LAN or LAN segment of the same VID connected to the network switch through different ports, the network switch cannot distinguish those LANs or LAN segments, and packets guided toward those LANs or LAN segments will be forwarded to the wrong ports. A method to solve this problem is to connect provider network 214 to LANs 204 and 208 with different network switches. For example, LAN 204 is connected to provider network 214 through network switch 220, and LAN 208 is connected to provider network 214 through network switch 222. Thus, the boundary switch 234 can forward the first packet to the network switch 220 and forward the second packet to the network switch 222 according to their extended VID. Nevertheless, the solution requires two network switches and added network switch increases the cost.

Figure 5:
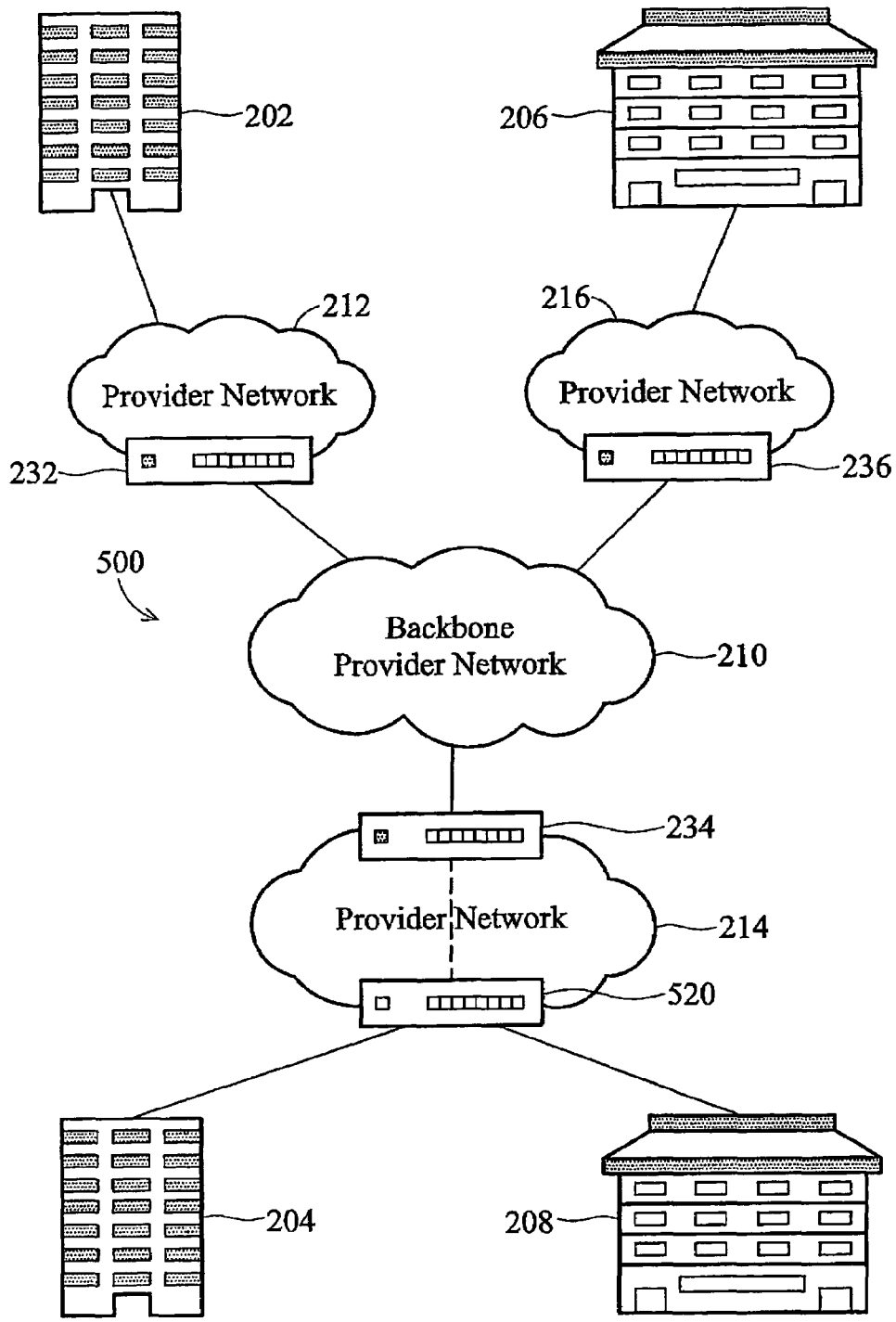
FIG. 5 shows an embodiment of a network system for realizing connections between four LANs belonging to the same VLAN with a single network switch according to the invention.

FIG. 5 shows an embodiment of a network system 500 for realizing connections between four LANs 202, 204, 206, and 208 belonging to the same VLAN with a single network switch 520 according to this invention. Network system 500 substantially resembles network system 400, but the network switch 520 supports multiple VID space and can distinguish LAN 204 and 208 of the same VID 4000. If there is more than one LAN or LAN segment of the same VID connected to network switch 520 through different ports, network switch 520 still can distinguish those LANs or LAN segments and packets towards those LANs or LAN segments will not be forwarded to the wrong ports. Thus, LAN 204 and 208 can connect to provider network 214 with a single network switch 520, and the cost for installing network system 500 can be eliminated. The network switch 520 connects directly to the boundary switch 234, and the boundary switch 234 can forward different packets to different ports of the network switch 520 according to their extended VID.

Figure 6:
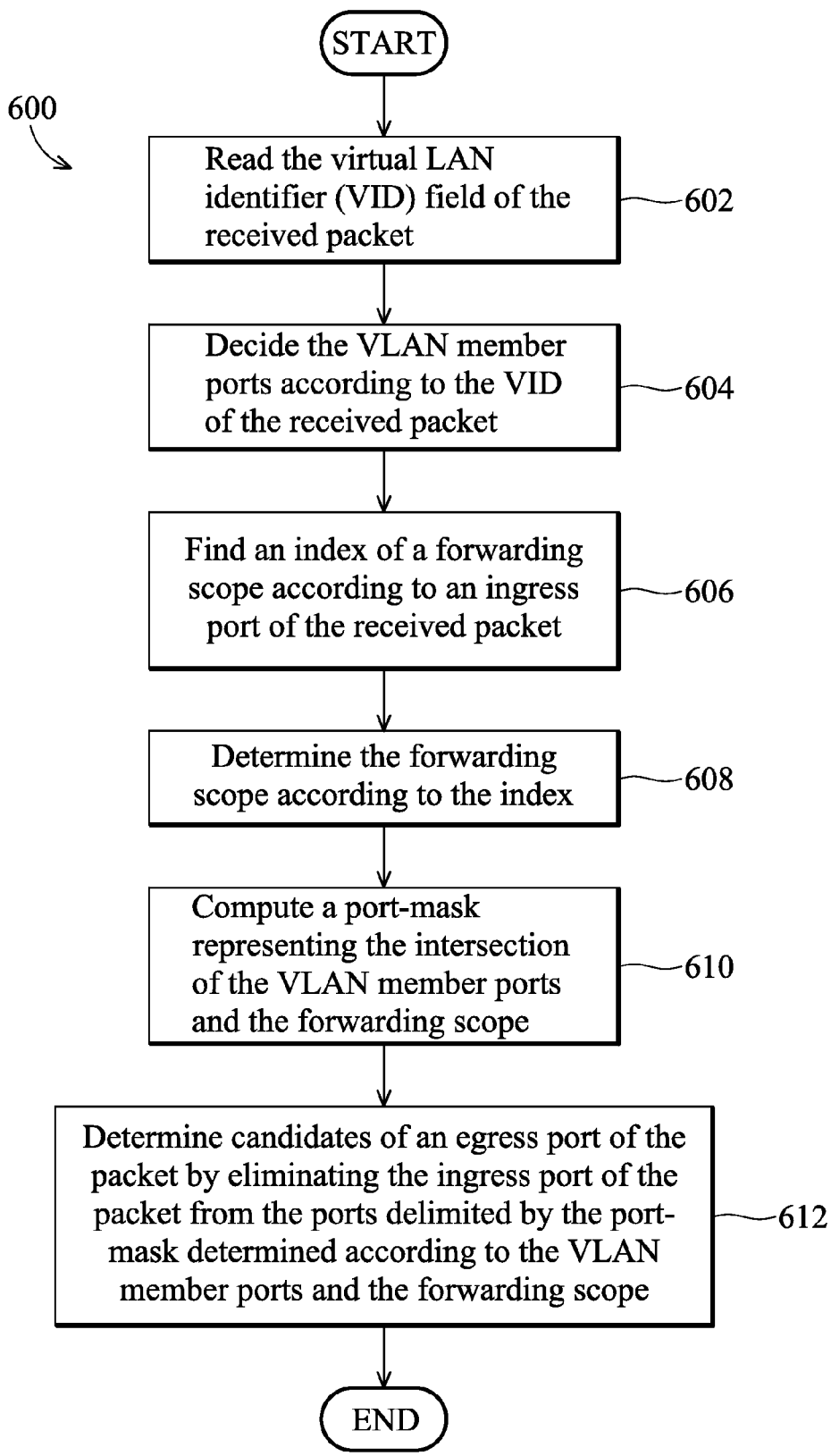
FIG. 6 is an embodiment of a method for deciding the egress port of packets exchanged between four LANs of the same VID by a network switch which supports multiple VID spaces according to the invention.

FIG. 6 is an embodiment of a method 600 for deciding the egress port of packets exchanged between four LANs 202, 204, 206, and 208 of the same VID by network switch 520 which supports multiple VID spaces according to this invention. Method 600 can be implemented by a core module of the network switch 520, and the core module forwards each packet received by network switch 520 to an appropriate egress port for guiding the packet towards its destination. Network switch 520 decides the egress port to which the received packet will be forwarded according to both the VID of the packet and a forwarding scope of the ingress port of the packet. The VID is not necessarily in the form of 802.1Q standard, but can also be in the form of port-based VID or other format of VLAN ID. The forwarding scope of an ingress port is a set of ports serving the packets of a subnet of a VLAN. The forwarding scope offers an extra layer of logical separation in addition to the VLAN and can be used to define broadcast domains among physically connected ports of a network switch. If the VLAN comprises the plurality of physical LANs, the plurality of physical LANs can be logically divided into a plurality of subnets of the VLAN, and the forwarding scope can represent ports of the network switch used for serving packets of one subnet of the VLAN.

If a network switch receives a broadcast packet, the network switch can reduce the number of broadcast ports by narrowing down the broadcast domain of specific VLAN to the ports included in both the VLAN member and the forwarding scope. If the network switch receives a uni-cast or multi-cast packet, the network switch can build a port-mask representing the intersecting ports of both VLAN members and forwarding scope to restrict the egress ports of the packet, and the egress port of the packet can be decided according to both the port-mask and the destination MAC address of the packet. Thus, a single network switch can support multiple VID spaces to substitute for multiple network switches supporting a single VID space.

Method 600 starts with step 602 to read the VID field of the received packet. Assume that the research department in city A sends a first packet towards the destination of the research department in city B, the business department in city C sends a second packet towards the destination of the business department in city B, and both the first packet and the second packet is now received by network switch 520 in FIG. 5. Assume the VID of both the received packet is 4000, which is the VID of the VLAN of the company. Network switch 520 must then decide which ports the received packets should be forwarded to.

Assume that there are 26 ports in network switch 520. LAN 204 connects to network switch 520 via Port 0, and the uplink port of the packets from LAN 202 is port 22. LAN 208 connects to network switch 520 via Port 1, and the uplink port of the packets from LAN 206 is port 23. Thus, the ports used for serving packets of VID 4000 are ports 0, 1, 22, and 23. The VLAN member in relation to the received packets is then looked up according to the VID of the received packets in step 604. Thus, the VLAN member of VID 4000 includes ports 0, 1, 22, and 23. If each of the ports of network switch 520 is represented with a bit in the hex-decimal format, the VLAN member of VID 4000 is represented with "0C00003H".

There can be several forwarding scopes coexisting in the network switch 520. The number of forwarding scopes can be the number of ports included by the network switch at most, and each port corresponds to a forwarding scope. Assume there are four forwarding scopes in network switch 520: forwarding scope 0~3. Because both the users of LAN 202 and LAN 204 are the research department of the company, port 0 and the uplink port 22 is included in forwarding scope 0. Thus, forwarding scope 0 can be represented in the hex-decimal format of "0400001H". Because both the users of LAN 206 and LAN 208 are the business department of the company, port 1 and the uplink port 23 is included in forwarding scope 1. Thus, forwarding scope 1 can be represented in the hex-decimal format of "0800002H". Additionally, ports 0 and 22 both associate with forward scope 0, and ports 1 and 23 both associate with forward scope 1.

After step 604 is executed, Network switch 502 can then find the index number of the forwarding scope associated with the ingress port of the received packet in step 606. For example, if the ingress port of the first packet is port 22, the index number of the forwarding scope associated with port 22 is 0 (i.e. forwarding scope 0). If the ingress port of the second packet is port 23, the index number of the forwarding scope associated with port 23 is 1 (i.e. forwarding scope 1). Thus, network switch 520 can decide the forwarding scope corresponding to both received packets according to the index numbers in step 608. The forwarding scope corresponding to the first packet is forwarding scope 0, the value of which is "0400001H". The forwarding scope corresponding to the second packet is forwarding scope 1, the value of which is "0800002H".

A port-mask can be decided for delimiting the egress port in Step 610. The port-mask can be calculated by executing "AND operation" of the VLAN member in step 604 and the forwarding scope in step 608. For example, the VLAN member of the first packet is "0C00003H" and the forwarding scope of the first packet is "0400001H". Thus, the port-mask of the first packet is "0400001H" and represents ports 0 and 22. The VLAN member of the second packet is "0C00003H" and the forwarding scope of the second packet is "0800002H". Thus, the port-mask of the second packet is "0800002H" and represents ports 1 and 23.

Finally, the egress port of the packet can be decided according to the port-mask in step 610 and the ingress port of the packet in step 412. Because the ingress port of the first packet is port 22 of network switch 520, the egress port must be the port represented by the port-mask of the first packet except for the ingress port 22. Thus, the egress port of the first packet is decided to be port 0, and the first packet is forwarded to port 0. Accordingly, because the ingress port of the second packet is port 23 of network switch 520, the egress port must be the port represented by the port-mask of the second packet except for the ingress port 23. Thus the egress port of the second packet is decided to be port 1, and the second packet is forwarded to port 1. The first packet is then received by LAN 204 and forwarded to the research department in city B according to its destination MAC address. The second packet is then received by LAN 208 and forwarded to the business department in city B according to its destination MAC address.

Additionally, if the research department in city B sends a third packet towards the destination of the research department in city A, and the business department in city B sends a fourth packet towards the destination of the business department in city C, both the third packet and the fourth packet are received by network switch 520 respectively via ingress ports 0 and 1. Because the VID field of both packets is 4000, the VLAN member can be decided to be ports 0, 1, 22, and 23 in step 604, which can be represented in hex-decimal format as "0C00003H". Because the ingress ports of the third and fourth packets are respectively ports 0 and 1, and the index number of the forwarding scope associated with ports 0 and 1 are respectively 0 and 1, the forwarding scopes of the third and fourth packets can be decided to be "0400001H" and "0800002H" in step 608. Thus, a port-mask of the third packet can be computed to be "0400001H" which represent ports 0 and 22 in step 610, and a port-mask of the fourth packet can be computed to be "0800002H" which represent ports 1 and 23 in step 610. Finally, an egress port of the third packet can be decided to be port 22 in step 612, and an egress port of the fourth packet can be decided to be port 23 in step 612.

In this disclosure, we provide a method for supporting multiple VLAN spaces within a single network switch. Ports for serving a specific VLAN are classified to be VLAN member of the specific VLAN. Each port of the network switch can be associated with a specific forwarding scope, which defines a subnet of VLAN member of the VLAN. If the network switch receives a packet with a VLAN ID field of the specific VALN, the network switch can build a port-mask representing the intersecting ports of both VLAN member and forwarding scope to restrict the egress ports of the packet, and the egress port of the packet can be decided according to both the port-mask and the destination MAC address of the packet. Thus, packets of a plurality of physical LANs belonging to the same VLAN can be processed with a single network switch, thereby reducing the cost of network switch equipment.

Finally, while the invention has been described by way of example and in terms of the above, it is to be understood that the invention is not limited to the disclosed embodiment. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for processing packets of a virtual local area network (VLAN) in a network switch, wherein the VLAN comprises a plurality of physical local area networks (LANs) and are divided into a plurality of subnets, the method comprising the steps of:
    receiving a packet through an ingress port of the network switch, wherein the packet is tagged with a VLAN identifier (VID) of the VLAN;
    reading the VID of the packet;
    finding a VLAN member according to the VID of the packet, wherein the VLAN member represents all ports dedicated to serving packets of the VLAN in the network switch;
    finding a forwarding scope according to the ingress port, wherein the ingress port is one of the ports dedicated to serving packets exchanged within a first subnet of the plurality of subnets, and the forwarding scope represents all ports dedicated to serving packets exchanged within the first subnet in the network switch; and
    executing an AND operation on the VLAN member and the forwarding scope to obtain an intersection of the VLAN member and the forwarding scope; and
    determining an egress port of the received packet from the intersection of the VLAN member and the forwarding scope.

2. The method according to claim 1, wherein the egress port is determined by selecting a remainder port from the intersection of the VLAN member and the forwarding scope after eliminating the ingress port of the packet.

3. The method according to claim 1, wherein both the VLAN member and the forwarding scope are represented in hex-decimal format by indicating selected ports with 1 and other unselected ports of the network switch with 0.

4. The method according to claim 1, wherein the intersection of the VLAN member and the forwarding scope can be represented as a port-mask to determine a broadcast domain of ports if the packet is a broadcast packet.

5. The method according to claim 1, wherein the intersection of the VLAN member and the forwarding scope can be represented as a port-mask to represent candidate ports the packet can be forwarded to, and the egress port can be determined according to both the port-mask and a destination MAC address of the packet.

6. The method according to claim 1, wherein the network switch is connected to a plurality of first physical LANs through a plurality of first ports of the network switch, each of the plurality of first physical LANs is one of the plurality of physical LANs and belongs to different one of the plurality of subnets, and each of the plurality of first ports is dedicated to one of the plurality of first physical LANs.

7. The method according to claim 6, wherein the network switch connects to a boundary switch of a provider network, and the boundary switch forwards packets of different subnets of the VLAN to corresponding ingress ports of the network switch.

8. The method according to claim 1, wherein there is a plurality of forwarding scopes recorded in the network switch, and each port of the network switch included in the VLAN member is assigned one of the plurality of forwarding scopes according to the subnets it serves.

9. The method according to claim 1, wherein the VID of the packet is a VID field of VLAN tag of IEEE 802.11Q or a VID field of a port-based VLAN.

10. A network switch for processing packets of a virtual local area network (VLAN), wherein the VLAN comprises a plurality of physical local area networks (LANs) and are divided into a plurality of subnets each of which includes some of the physical LANs, comprising:
    a plurality of ports, for receiving and transmitting a packet exchanged within the VLAN; and
    a core module, coupled to the plurality of ports, for finding a VLAN member according to a VLAN identifier (VID) of the packet, finding a forwarding scope according to an ingress port of the packet, executing an AND operation on the VLAN member and the forwarding scope to obtain an intersection of the VLAN member and the forwarding scope, determining an egress port of the packet from the plurality of ports according to the intersection of the VLAN member and the forwarding scope, and forwarding the packet to the egress port;
    wherein the VID is identifier of the VLAN, the VLAN member represents all of the plurality of ports dedicated to serving packets of the VLAN, the ingress port is one of the plurality of ports dedicated to serving packets exchanged within a first subnet of the plurality of subnets, the forwarding scope represents all of the plurality of ports dedicated to serving packets exchanged within the first subnet.

11. The network switch according to claim 10, wherein the egress port is determined by selecting a remainder port from the intersection of the VLAN member and the forwarding scope after eliminating the ingress port of the packet.

12. The network switch according to claim 10, wherein both the VLAN member and the forwarding scope are represented in hex-decimal format by indicating selected ports with 1 and other unselected ports of the plurality of ports with 0.

13. The network switch according to claim 10, wherein the intersection of the VLAN member and the forwarding scope can be represented as a port-mask to determine a broadcast domain of port if the packet is a broadcast packet.

14. The network switch according to claim 10, wherein the intersection of the VLAN member and the forwarding scope can be represented as a port-mask to represent candidate egress ports the packet can be forwarded to, and the egress port can be decided according to both the port-mask and a destination MAC address of the packet.

15. The network switch according to claim 10, wherein the network switch is connected to a plurality of first physical LANs through a plurality of first ports of the network switch, each of the plurality of first physical LANs is one of the plurality of physical LANs and belongs to different one of the plurality of subnets, and each of the plurality of first ports is dedicated to one of the plurality of first physical LANs.

16. The network switch according to claim 15, wherein the network switch connects to a boundary switch of a provider network, and the boundary switch forwards packets of different subnets of the VLAN to different corresponding ingress ports of the network switch.

17. The network switch according to claim 10, wherein there is a plurality of forwarding scopes recorded in the network switch, and each of the plurality of ports included in the VLAN member is assigned one of the plurality of forwarding scopes according to the subnets it serves.

18. The network switch according to claim 10, wherein the VID of the packet is a VID field of VLAN tag of IEEE 802.11Q or a VID field of a port-based VLAN.

* * * * *